United States Patent Office 2,921,078
Patented Jan. 12, 1960

2,921,078

DERIVATIVES OF DIHYDRO AND TETRAHYDROFURANS

Werner Richard Boehme, Somerville, N.J., assignor to Ethicon, Inc., a corporation of New Jersey No Drawing. Application August 27, 1958
Serial No. 757,451

11 Claims. (Cl. 260—297)

This invention relates to a new series of organic compounds and, more particularly, to 2-$R_1$-2,5-$R_2R_3$-2,5-dihydrofurans, the corresponding tetrahydrofurans and to methods for their preparation.

This application is a continuation-in-part of my copending application Serial No. 695,200, now abandoned, filed November 8, 1957.

The novel compounds of this invention may be represented by the following general structural formula:

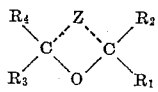

wherein Z is an ethylene or vinylene radical which, if desired, may be substituted by a carboxyl group, an alkyl radical such as methyl, ethyl, propyl, isopropyl, butyl, isobutyl, etc., or an ether group, such as methoxy, ethoxy, propoxy, etc. Further, $R_1$ in the above structural formula is the group:

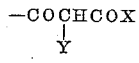

wherein Y is hydrogen or a saturated lower hydrocarbon, i.e. lower alkyl such as methyl, ethyl, propyl, isopropyl, butyl, isobutyl, pentyl, isopentyl, hexyl, isohexyl, etc.; X is hydrogen or a lower hydrocarbon such as one of those defined hereinbefore; cycloalkyl, for example cyclopentyl, cyclohexyl; monocyclic aryl, for example phenyl which, if desired, may be further substituted by alkyl or alkoxy groups; dialkylaminoalkyl, for example dimethylaminomethyl, dimethylaminoethyl, diethylaminomethyl, diethylaminoethyl, etc., a heterocyclic substituent containing oxygen, nitrogen or sulfur linkages, for example morpholyl, pyrrolidyl, piperidyl, pyridyl, thiazolyl, etc.; $R_2$ and $R_3$ are, interchangeably, lower alkoxy, for example methoxy, ethoxy, propoxy, isopropoxy, butoxy, isobutoxy, etc., and $R_4$ is hydrogen, lower alkyl, for example methyl, ethyl, propyl, isopropyl, butyl, isobutyl, pentyl, etc.

The compounds of this invention are useful as intermediates. 2-acetoacetyl-2,5-dimethoxy-2,5-dihydrofuran, for example, may be converted to 2,3,6-trihydroxyacetophenone and 2,2',4,4',5,5'-hexahydroxy-3,3'-diacetylbiphenyl as shown in Example III below. Further, 2-acetoacetyl-2,5-dimethoxytetrahydrofuran may be converted to 2,3-dihydroxyacetophenone as shown in Example IV below. These and other polyhydroxyphenylketones, whose preparation from the novel compounds of this invention will be obvious to those skilled in the art, are known. They find application in the chemical and related industries, as tanning agents, as constituents (along with ferrous salts, i.e. sulfates, etc.) in permanent inks, and as photographic developers. Their usefulness as tanning agents stems from their ability to complex with proteins, e.g. collagen, to form products which are more durable and more resistant to enzymatic digestion than the proteins themselves. Further, the compounds of this invention, by virtue of the diketo group in the 2-position are useful as chelating agents, being capable of forming chelates with such metals as lead, uranium, cobalt, iron, nickel, etc. Because of their ability to absorb ultraviolet light in the range from 280 to 300 millimicrons, the novel compounds are also useful as ingredients in sun screen compositions. For this purpose they may be incorporated into suitable carriers such as hydrophilic ointment bases (e.g. Hydrophilic Ointment, U.S.P. XV) or lotions in quantities ranging from 2% to 10% in accordance with methods well known to those skilled in the art.

The novel compounds of this invention may be prepared by condensing an appropriately substituted furoic acid ester with a monoketone or monoketo derivative containing at least one alpha hydrogen atom, for example acetone, acetophenone, 4-diethylamino-2-pentanone, cyclohexanone, acetylthiophene, cyclopentylacetone, phenylacetone, etc. in the presence of a strong basic catalyst. The condensation is preferably conducted in the presence of a suitable organic solvent such as an ethereal solvent; for example dioxane, diethyl ether, tetrahydrofuran; a hydrocarbon such as hexane, benzene or toluene, or an alkanol such as methanol or ethanol.

As catalysts there may be used any one of a variety of strong bases such as the alkali metal hydrides; for example sodium or potassium hydride; alkali metal alkoxides, for example sodium ethoxide or potassium t-butoxide; metallic sodium, alkali metal amides, such as sodamide or potassium amide; triphenyl methyl sodium; mesitylmagnesium bromide, etc.

The reaction may be carried out over a wide temperature range, depending upon the nature of the reactants undergoing condensation and the volatility of the solvents employed; for example, from about 0° C. to about 125° C. In most cases a range from about 30° C. to about 100° C. is adequate.

If desired, the novel dihydrofurans of this invention may be converted to the corresponding tetrahydrofurans by catalytic hydrogenation, that is to say, with hydrogen in the presence of a catalyst selected from the metals of the eighth group of the periodic system, such as nickel, for example Raney nickel; palladium, platinum or rhodium. They may be employed on carriers such as barium carbonate or charcoal, in the form of special preparations such as palladium black, or preferably, as oxides such as platinum oxide. The reduction is most advantageously carried out in the presence of a solvent such as a lower alkanol, for example methanol or ethanol and, if so desired, under pressure.

Yet another convenient method for preparing the novel tetrahydrofurans of this invention is by hydrogenation of the appropriately substituted dihydrofuroic acid ester, followed by Claisen condensation to the desired diketone. The hydrogenation and subsequent conversion to the diketone may be carried out in accordance with the methods described hereinabove.

The following examples are illustrative of the invention, but are not to be construed as limitative thereon.

*Example I*

A solution of 38.0 parts by weight of ethyl furoate and one part by volume of concentrated sulfuric acid in 250 parts by volume of methanol is electrolyzed in a nickel cathode-graphite anode cell as described by Clauson-Kaas, Limborg and Glens, Acta. Chem. Scand. 6, 531 (1952). 19.4 ampere hours are passed in 8 hours beginning at 9 volts and 3.5 amperes at −15 to −22° C. The solution is then neutralized with a solution of sodium methoxide in methanol and concentrated under reduced pressure. The precipitated sodium sulfate is filtered off and the filtrates distilled. The product, ethyl 2,5-dimethoxy-2,5-dihydrofuroate, boils at 136–139° C./21 mm., $n_D^{25}$ 1.4480.

A mixture of 25.9 parts by weight of ethyl 2,5-dimethoxy-2,5-dihydrofuroate, 6.8 parts by weight of sodium hydride and 6 glass marbles is stirred slowly in a 3-neck 500 ml. round-bottom flask. A solution of 16.5 parts by weight of acetone in 25 parts by volume of anhydrous ether is added dropwise during a period of a half hour, maintaining the temperature at 30–40° C. with occasional cooling. Hydrogen is evolved and a thick amber paste results. Stirring is continued for a half hour longer, 100 parts by volume of anhydrous ether is added and the mixture is allowed to stand at room temperature for three days. Fifteen parts by volume of 95% ethanol is added, the mixture is cooled to 0° C., and the complex decomposed with 100 parts by volume of water and 18 parts by weight of acetic acid. The layers are separated and the aqueous phase is extracted with 50 parts by volume of ether. The combined ether solutions are washed with sodium bicarbonate solution and dried over anhydrous magnesium sulfate. Distillation of the ether solution gives a light yellow liquid, 2-acetoacetyl-2,5-dimethoxy-2,5-dihydrofuran, boiling at 97° C./0.2 mm., $n_D^{23}$ 1.4956.

*Example II*

A mixture of 26.1 parts by weight of methyl 2,5-dimethoxytetrahydrofuroate [prepared by the method of Clauson-Kaas and Limborg, Acta. Chem. Schand. 6, 551 (1952)], 6.6 parts by weight of sodium hydride and 6 glass marbles is treated with 16 parts by weight of acetone in 25 parts by volume of anhydrous ether, and the product, 2-acetoacetyl-2,5-dimethoxytetrahydrofuran, is isolated as in the foregoing example. It is obtained as a pale yellow liquid boiling at 87–91° C./0.5 mm., $n_D^{23.5}$ 1.4825.

*Example III*

A mixture of 5.35 parts by weight of 2-acetoacetyl-2,5-dimethoxy-2,5-dihydrofuran, 50 parts by volume of 0.1 N hydrochloric acid and a small chip of Dry Ice is stirred for six hours in a closed flask. 2,2',4,4',5,5'-hexahydroxy-3,3'-diacetylbiphenyl separates as a mustard-yellow precipitate and is removed by filtration of the suspension. It melts at 280° C. (dec.).

The clear yellow filtrates are cooled in ice. 2,3,6-trihydroxy-acetophenone separates as brilliant yellow crystals which are purified by recrystallization from water or by sublimation under reduced pressure. The melting point is 157.5–159° C.

*Example IV*

A mixture of 7.4 parts by weight of 2-acetoacetyl-2,5-dimethoxytetrahydrofuran and 75 parts by volume of 0.1 N hydrochloric acid is refluxed for one hour with stirring and cooled. The yellow crystalline product, 2,3-dihydroxyacetophenone, which separates, is removed by filtration. It melts at 98–98.5° C. when recrystallized from benzene-hexane.

*Example V*

A mixture of 38.0 parts by weight of methyl 2,5-dimethoxytetrahydrofuroate, 4.8 parts by weight of sodium hydride and 12.1 parts by weight of 3-acetylpyridine is condensed and the product, 2-nicotinoylacetyl-2,5-dimethoxytetrahydrofuran, is isolated as in Example I. It is a viscous yellow oil boiling at 150–158° C./0.06 mm. (with slight decomposition), which solidifies after several months.

A solution of 8.5 parts by weight of 2-nicotinoylacetyl-2,5-dimethoxytetrahydrofuran in 200 parts by volume of 0.5 N hydrochloric acid is heated on the steam bath for one hour. When the solution is neutralized with sodium bicarbonate, a yellow precipitate of 3-nicotinoylcatechol separates. It melts at 154–156° C. when recrystallized from heptane.

*Example VI*

A solution of 38.0 parts by weight of ethyl furoate and 250 parts by volume of absolute ethanol containing one part by volume of concentrated sulfuric acid is electrolyzed and the ethyl 2,5-diethoxy-2,5-dihydrofuroate (31.6 parts by weight, boiling point 145–150° C./21 mm.) is isolated as in Example I. The product is condensed with 16.5 parts by weight of acetone and 6.8 parts by weight of sodium hydride as in Example I, giving 2-acetoacetyl-2,5-diethoxy-2,5-dihydrofuran. Upon hydrolysis (as in Example III) it gives 2,3,6-trihydroxyacetophenone, melting point 158–159° C.

*Example VII*

A mixture of 38.0 parts by weight of methyl 2,5-dimethoxytetrahydrofuroate, 4.8 parts by weight of sodium hydride and 25.8 parts by weight of diethylaminoacetone [prepared by the method of Magee and Henze, J.A.C.S. 60, 2148 (1938)], is condensed as in Example I. The dried ether extracts upon evaporation at 50° C./0.1 mm. leaves a viscous residue of 2-diethylaminoacetoacetyl-2,5-dimethoxytetrahydrofuroate.

*Example VIII*

A mixture of 38.0 parts by weight of methyl 2,5-dimethoxytetrahydrofuroate, 4.8 parts by weight of sodium hydride and 24.6 parts by weight of methyl cyclohexyl ketone [prepared according to Walker and Hauser, J.A.C.S. 68, 1386 (1946)], is condensed as in Example I. The dried ethereal solution is distilled on the steam bath at 100° C./0.1 mm., leaving a liquid residue of 2-(-cyclohexanecarbonylacetyl) - 2,5 - dimethoxytetrahydrofuran.

*Example IX*

A mixture of 31.6 parts by weight of methyl 2,5-dimethoxy-5-isopropyltetrahydrofuroate [prepared according to Nedenskov et al., Acta. Chem. Scand. 9, 17 (1955)], 6.8 parts by weight of sodium hydride and 16.5 parts by weight of acetone is condensed as in Example I to give 2-acetoacetyl-5-isopropyl-2,5-dimethoxytetrahydrofuran boiling at 93–97° C./0.1 mm.

*Example X*

A mixture of 25.9 parts by weight of methyl 2,5-dimethoxytetrahydrofuroate, 6.8 parts by weight of sodium hydride and 28.5 parts by weight of pinacolone is condensed as in Example I. The resulting 2-pivaloylacetyl-2,5-dimethoxytetrahydrofuran boils at 105–112° C./0.1 mm.

*Example XI*

A mixture of 25.9 parts by weight of methyl 2,5-dimethoxytetrahydrofuroate, 6.8 parts by weight of sodium hydride and 45.0 parts by weight of 4-methylpropiophenon [prepared according to Noller and Adams, J.A.C.S. 46, 1889 (1924)], is condensed as in Example I. Distillation of the dried ether solution at 150° C./0.1 mm. leaves a liquid residue of 2-[-α-(4-methylbenzoyl)-propionyl]-2,5-dimethoxytetrahydrofuran.

*Example XII*

A mixture of 38.0 parts by weight of methyl 2,5-dimethoxytetrahydrofuroate, 4.8 parts by weight of sodium hydride and 24 parts by weight of acetophenone is condensed as in Example I. Distillation of the dried ether solution on the steam bath at 0.1 mm. leaves a viscous residue of 2-benzoylacetyl-2,5-dimethoxytetrahydrofuran which is hydrolyzed by the procedure described in Example IV to 2,3-dihydroxybenzophenone, melting point 65° C.

Example XIII

| | Percent |
|---|---|
| 2-acetoacetyl-2,5-dimethoxy-2,5-dihydrofuran | 9.0 |
| Glycerin | 3.0 |
| Borax | 2.0 |
| Alcohol | 15.0 |
| Water | 70.5 |
| Perfume | 0.5 |

Heat the water, dissolve the borax in it and add the dihydrofuran. Stir until dissolved, mix the perfume with the alcohol, add the glycerin and stir this into the dihydrofuran solution. Filter (Modern Cosmetics, pp. 317–318, 3rd edition, published by Drug and Cosmetics Industry).

What is claimed is:

1. The new compound 2-acetoacetyl-2,5-dimethoxy-2,5-dihydrofuran.
2. The new compound 2-acetoacetyl-2,5-dimethoxytetrahydrofuran.
3. The new compound 2-nicotinoylacetyl-2,5-dimethoxytetrahydrofuran.
4. The new compound 2-acetoacetyl-2,5-diethoxy-2,5-dihydrofuran.
5. The new compound 2-diethylaminoacetoacetyl-2,5-dimethoxytetrahydrofuran.
6. The new compound 2-(-cyclohexanecarbonylacetyl)-2,5-dimethoxytetrahydrofuran.
7. The new compound 2-acetoacetyl-2,5-dimethoxy-5-isopropyl tetrahydrofuran.
8. The new compound 2-pivaloylacetyl-2,5-dimethoxytetrahydrofuran.
9. The new compound 2-[α-(4-methylbenzoyl)-propionyl]-2,5-dimethoxytetrahydrofuran.
10. The new compound 2-benzoylacetyl-2,5-dimethoxytetrahydrofuran.
11. A compound of the general formula:

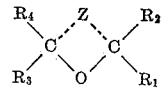

wherein Z is a member of the group consisting of ethylene, vinylene, lower alkyl ethylene, lower alkoxy ethylene, lower alkyl vinylene and lower alkoxy vinylene; $R_1$ is the radical

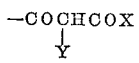

wherein Y is a member of the group consisting of hydrogen and lower alkyl; and X is a member of the group consisting of hydrogen, lower alkyl, cycloalkyl containing 5 to 6 carbon atoms, phenyl, lower alkyl phenyl, pyridyl and lower dialkylaminoalkyl; $R_2$ and $R_3$ are lower alkoxy; and $R_4$ is a member of the group consisting of hydrogen and lower alkyl.

No references cited.